(12) United States Patent
von Ahn et al.

(10) Patent No.: US 7,785,180 B1
(45) Date of Patent: Aug. 31, 2010

(54) METHOD, APPARATUS, AND SYSTEM FOR OBJECT RECOGNITION, OBJECT SEGMENTATION AND KNOWLEDGE ACQUISITION

(75) Inventors: Luis von Ahn, Pittsburgh, PA (US);
Ruoran Liu, Pittsburgh, PA (US);
Manuel Blum, Pittsburgh, PA (US);
Alexei A. Efros, Pittsburgh, PA (US);
Maria Manuela Veloso, Pittsburgh, PA (US)

(73) Assignee: Carnegie Mellon University, Pittsburgh, PA (US)

( * ) Notice: Subject to any disclaimer, the term of this patent is extended or adjusted under 35 U.S.C. 154(b) by 156 days.

(21) Appl. No.: 11/486,561

(22) Filed: Jul. 14, 2006

Related U.S. Application Data

(60) Provisional application No. 60/699,692, filed on Jul. 15, 2005.

(51) Int. Cl.
*A63F 9/00* (2006.01)
(52) U.S. Cl. ......................................................... 463/9
(58) Field of Classification Search .................. 463/9; 273/236–243, 270, 282.1; 434/322; 446/414
See application file for complete search history.

(56) References Cited

U.S. PATENT DOCUMENTS

| | | | | |
|---|---|---|---|---|
| 5,056,793 A | * | 10/1991 | Sigle | 273/282.2 |
| 5,386,999 A | * | 2/1995 | Rice | 273/287 |
| 5,465,982 A | * | 11/1995 | Rebane | 463/9 |
| 6,322,074 B1 | * | 11/2001 | Forrest et al. | 273/272 |
| 6,935,945 B2 | | 8/2005 | Orak | |
| 2004/0002369 A1 | * | 1/2004 | Walker et al. | 463/1 |
| 2005/0014118 A1 | | 1/2005 | von Ahn Arellano | |
| 2007/0016689 A1 | * | 1/2007 | Birch | 709/241 |
| 2007/0018393 A1 | * | 1/2007 | Ritter et al. | 273/272 |
| 2007/0087803 A1 | * | 4/2007 | Kinzer et al. | 463/9 |

FOREIGN PATENT DOCUMENTS

| | | |
|---|---|---|
| JP | 2007-148350 | 6/1995 |
| JP | 2002-035411 | 2/2002 |
| JP | 2002-051282 | 2/2002 |
| JP | 2002-159741 | 6/2002 |
| JP | 2002-175135 | 6/2002 |
| JP | 2002-253840 | 9/2002 |

OTHER PUBLICATIONS iSketch. Jun. 30, 2005. <http://web.archive.org/web/20050630234801/http://www.isketch.net/instructions/index.shtml>.*

(Continued)

*Primary Examiner*—Peter DungBa Vo
*Assistant Examiner*—Seng Heng Lim
(74) *Attorney, Agent, or Firm*—Fox Rothschild LLP; Dennis M. Carleton

(57) ABSTRACT

A method, comprising displaying an image to a first player, displaying a portion of the image to a second player wherein the portion of the image displayed to the second player is less than all of the image and wherein the portion of the image displayed to the second player is determined by an action of the first player, allowing the second player to submit a word, and determining whether the word submitted by the second player is related to the image. The present invention also includes apparatuses and systems.

23 Claims, 13 Drawing Sheets

OTHER PUBLICATIONS von Ahn, L., and Dabbish, L. Labeling Images with a Computer Game. In ACM Conference on Human Factors in Computing Systems (CHI), 2004, pp. 319-326.

von Ahn, L., Ginosar, S., Kedia, M., Ruoran L. and Blum, M. Improving Accessibility of the Web with a Computer Game. ACM Conference on Human Factors in Computing Systems (CHI Notes), 2006.

von Ahn, L., Kedia, M. and Blum, M. Verbosity: A Game for Collecting Common-Sense Facts. ACM Conference on Human Factors in Computing Systems (CHI Notes), 2006.

Barnard, K., and Forsyth, D. Learning the Semantics of Words and Pictures. International Conference of Computer Vision, 2001, pp. 408-415.

Duygulu, P., Barnard, K., de Freitas, J.F. G., and Forsyth, D. A. Object Recognition as Machine Translation: Learning a Lexicon for a Fixed Image Vocabulary. European Conference on Computer Vision, 2002, pp. 97-112.

Fails, J.A., and Olsen, D.R. A Design Tool for Camera-Based Interaction. In ACM Conference on Human Factors in Computing Systems (CHI), 2003, pp. 449-456.

Fleck, M. M., Forsyth, D. A.., and Bregler, C. Finding Naked People. European Conference on Computer Vision, 1996, pp. 563-602.

Russell, B. C., Torralba, A. Murphy, K.P. and Freeman, W. T. LabelMe: a database and web-based tool for image annotation. MIT AI Lab Memo AIM-2005-025, Sep. 2005.

Schneiderman, H. and Kanade, T. Object Detection Using the Statistics of Parts. International Journal of Computer Vision, 2002.

Stork, D. G. and Lam C. P. Open Mind Animals: Insuring the quality of data openly contributed over the World Wide Web. AAAI Workshop on Learning with Imbalanced Data Sets, 2000, pp. 4-9.

Stork, D. G. The Open Mind Initiative. IEEE Intelligent Systems and Their Applications, 14-3, 1999, pp. 19-20.

Torralba, A., Murphy, K.P. and Freeman, W. T. The MIT CSAIL Database of objects and scenes. http://web.mit.edu/torralba/www/database.html.

Homepage of Corbis available at website http://pro.corbis.com/default.aspx on Jun. 17, 2004, 1 pg.

Homepage of Gettyimages available at website http://www.gettyimages.com/source/home/home.aspx on Jun. 17, 2004, 1pg.

P.Duygulu, et al., Object Recognition as Machine Translation:Learning a Lexicon for a Fixed Image Vocabulary, 15 pgs., Berkeley, CA.

H. Schneiderman, et al., Object Detection Using the Statistics of Parts, Int'l Journal of Computer Vision, 2002, 58 pgs.

Luis Von Ahn, et al., Labeling Images with a Computer Game, ACM-CHI, Apr. 2004, pp. 319-326, vol. 6, No. 1, Vienna, Austria.

Laura Dabbish, et al., Coordinating Communication:Awareness Displays and Interruption, ACM-CHI, Apr. 2003, pp. 786-787, Ft. Lauderdale, FL.

Homepage of Hot or Not available at website: http://web.archive.org/web/20030401170111/http://www.hotornot.com, 3pgs.

European Patent Office, Patent Abstracts of Japan, Abstract for Publication No. 08016807, Jan. 19, 1996, 1 pg., Japan.

Nintendo Super Mario Kart:FAQ by PsyTom2000, available at website http://www.gamefaqs.com/console/snes/file/588738/15394, 28 pgs.

Gustavo Carneiro, et al., Supervised Learning of Semantic Classes for Image Annotation and Retrieval, IEEE Transactions on Patern Analysis and Machine Intelligence, vol. 29, No. 3, Mar. 2007, pp. 394-410.

Louis Vuurpijl, et al., Vind(x): using the user through cooperative annotation, Proceedings of the Eighth International Workshop on Frontiers in Handwriting Recognition (IWFHR'02), 2002, 6 pages.

* cited by examiner

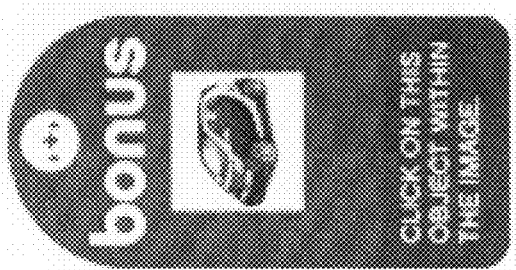
Fig. 8

Fig. 10

METHOD, APPARATUS, AND SYSTEM FOR OBJECT RECOGNITION, OBJECT SEGMENTATION AND KNOWLEDGE ACQUISITION

CROSS-REFERENCE TO RELATED APPLICATIONS

This application claims priority from U.S. Provisional Patent Application No. 60/699,692, filed Jul. 15, 2005, which is incorporated herein by reference. This application is related to U.S. patent application Ser. No. 10/875,913, filed Jun. 24, 2004.

STATEMENT REGARDING FEDERALLY-SPONSORED RESEARCH AND DEVELOPMENT

This invention was made, in part, with government support under Grant Number CCR-0122581 awarded by the National Science Foundation. The United States government may have certain rights in this invention.

FIELD OF THE INVENTION

The present invention is directed generally to methods, apparatuses, and systems for object recognition, object segmentation, and knowledge acquisition and, more particularly, for creating a database associating information with particular parts of an image.

BACKGROUND OF THE INVENTION

Humans understand and analyze everyday images with little effort. For example, humans understand what objects are in an image, where objects are located relative to other objects in an image, what portion of the image is the background, and what portion of the image is the foreground. Computers, on the other hand, still have trouble with such basic visual tasks as reading distorted text or finding where in an image a simple object is located. Although researchers have proposed and tested many impressive algorithms for computer vision, none have been made to work reliably and generally.

Most of the best approaches for computer vision (e.g. Barnard, K., and Forsyth, D. A. Learning the Semantics of Words and Pictures. *International Conference of Computer Vision,* 2001, pages 408-415; Duygulu, P., Barnard, K., de Freitas, N., and Forsyth, D. A. Object recognition as machine translation: Learning a lexicon for a fixed image vocabulary. *European Conference on Computer Vision,* 2002, pages 97-112; Russell, B. C., Torralba, A. Murphy, K. P. and Freeman, W. T. LabelMe: a database and web-based tool for image annotation. *MIT AI Lab Memo* AIM-2005-025, September, 2005; and Scheniderman, H. and Kanade, T. Object Detection Using the Statistics of Parts. *International Journal of Computer Vision,* 2002.) rely on machine learning: train an algorithm to perform a visual task by showing it example images in which the task has already been performed. For example, training an algorithm for testing whether an image contains a dog would involve presenting it with multiple images of dogs, each annotated with the precise location of the dog in the image. After processing enough images, the algorithm learns to find dogs in arbitrary images. A major problem with this approach, however, is the lack of training data, which, obviously, must be prepared by hand. Databases for training computer vision algorithms currently have hundreds or at best a few thousand images (Torralba, A., Murphy, K. P. and Freeman, W. T. The MIT CSAIL Database of objects and scenes. http://web.mit.edu/torralba/www/database.html), which is orders of magnitude less than what is required.

Prior art methods have attempted to gather useful data about images. The ESP Game (von Ahn, L., and Dabbish, L. Labeling Images with a Computer Game. In *ACM Conference on Human Factors in Computing Systems (CHI),* 2004, pages 319-326) is two-player game that collects word labels for arbitrary images. The ESP Game collects images from the Web and outputs word labels describing the contents of the images. The game has already collected millions of labels for arbitrary images. Given an image, the ESP Game can be used to determine what objects are in the image, but cannot be used to determine where in the image each object is located. Such location information is necessary for training and testing computer vision algorithms, so the data collected by the ESP Game is not sufficient for some purposes. The present invention improves on the data collected by the ESP Game. The present invention can be used to output precise location information and other information useful for training computer vision algorithms for each object in the image.

The Open Mind Initiative (e.g., Stork, D. G. and Lam C. P. Open Mind Animals: Ensuring the quality of data openly contributed over the World Wide Web. *AAAI Workshop on Learning with Imbalanced Data Sets,* 2000, pages 4-9; Stork, D. G. The Open Mind Initiative. *IEEE Intelligent Systems and Their Applications,* 14-3, 1999, pp. 19-20) is a worldwide effort to develop "intelligent" software. Open Mind collects data from regular Internet users (referred to as "netizens") and feeds it to machine learning algorithms. Volunteers participate by answering questions and teaching concepts to computer programs. However, The Open Mind Initiative does not offer a fun experience for the volunteers who participate. It is not expected that volunteers will annotate the needed images in the format used by The Open Mind Initiative because there is not sufficient incentive or entertainment for doing so.

LabelMe (Russell, B. C., Torralba, A. Murphy, K. P. and Freeman, W. T. LabelMe: a database and web-based tool for image annotation. *MIT AI Lab Memo* AIM-2005-025, September, 2005) is a web-based tool for image annotation. Anybody can annotate data using this tool and thus contribute to constructing a large database of annotated objects. The incentive to annotate data is the data itself. You can only have access to the database once you have annotated a certain number of images. LabelMe relies on people's desire to help and thus assumes that the entered data is correct.

Another area of related work is that of interactively training machine learning algorithms (e.g., Fails, J. A., and Olsen, D. R. A Design Tool for Camera-Based Interaction. In *ACM onference on Human Factors in Computing Systems (CHI),* 2003, pages 449-456). In these systems, a user is given immediate feedback about how well an algorithm is learning from the examples provided by them. As with other prior art attempts, this prior art fails to provide motivation to participants and it does not have significant controls to ensure that the data collected is accurate.

U.S. Pat. No. 6,935,945, issues to Orak, describes an Internet game in which players are shown portions of an image and the players guess what the image is. The Orak patent, however, fails to teach how useful information about the images can be captured. In addition, the Orak patent fails to teach creating a database of useful information about the images. As a result, the Orak patent may describe an entertaining Internet game, but it fails to teach how to solve the problems in the prior art.

Accordingly, there is a need for a database and a method, apparatus, and system for creating a database with a large number of images, for example, to train computer vision algorithms to recognize one or many different kinds of images. The database should be annotated with information about what objects are in the image, where each object is located, and how much of the image is necessary to recognize it.

BRIEF SUMMARY OF THE INVENTION

The present invention is directed to methods, apparatuses, and systems for object recognition, object segmentation, and knowledge acquisition. In particular, the present invention can be used for collecting information and constructing a database. According to one embodiment, the database may contain a large number of images for training computer vision algorithms to recognize one or many different kinds of images, although databases for other purposes may also be constructed. The database may include one or more different kinds of annotations. For example, the database may include information about what objects are in the image, where each object is located, what the boundaries of the object are, and how much of the image is necessary to recognize it. Other information may also be collected and included in the database. The database may be similar to those previously shown to be useful for training computer vision algorithms (e.g. Torralba, A., Murphy, K. P. and Freeman, W. T. The MIT CSAIL Database of objects and scenes. http://web.mit.edu/torralba/www/database.html), or it may be different.

According to one embodiment, the database may be constructed through the use of a game, which will be referred to as "Peekaboom". The database may be of any form or format. The game may be played over a public network, such as the Internet, or it may be played on private networks, or it may be played in other environments, such as on stand-alone machines.

According to another embodiment of the present invention, a database for training computer vision algorithms is constructed as a result of people playing the game. The accuracy of the database can be achieved with a high degree of confidence, even if the people playing the game don't intend such a result. The game can also be used to improve image search results and to calculate object bounding-boxes similar to those in Flickr (Flickr Photo Sharing Service. http://www.flickr.com) (see FIG. 11).

By playing a game, people help to collect data not because they want to be helpful, but because they have fun. The present invention can be treated as a "human algorithm": on input of an image, it outputs (with arbitrarily high probability) a correct annotation of the image. Instead of using a silicon processor, this "algorithm" runs on a processor consisting of regular humans interacting throughout the Web.

Unlike the prior art, the present invention provides a motivation for participants. In particular, the present invention provides an enjoyable and entertaining environment in which useful data is collected. Furthermore, unlike many prior art solutions, the present invention has multiple mechanisms to prevent participants from polluting the data.

Many variations are possible with the present invention. These and other teachings, variations, and advantages of the present invention will become apparent from the following detailed description of the invention.

BRIEF DESCRIPTION OF THE SEVERAL VIEWS OF THE DRAWING

Embodiments of the present invention will now be described, by way of example only, with reference to the accompanying drawings for the purpose of illustrating the embodiments, and not for purposes of limiting the invention, wherein:

FIG. 8 illustrates one embodiment of a display during a bonus round according to the present invention;

FIG. 10 illustrates one embodiment of a display showing scores in one embodiment of a game according to the present invention;

DETAILED DESCRIPTION OF THE INVENTION

The present invention is directed to methods, apparatuses, and systems for object recognition, object segmentation, and knowledge acquisition. In particular, the present invention can be used for collecting information and constructing a database. According to one embodiment, the database may contain a large number of images for training computer vision algorithms to recognize one or many different kinds of images, although databases for other purposes may also be constructed. The database may be of any form and format, and may include one or more different kinds of annotations or information. For example, the database may include information about what objects are in the image, where each object is located, what the boundaries of the object are, and how much of the image is necessary to recognize it. Other information may also be collected and included in the database. The database may be similar to those previously shown to be useful for training computer vision algorithms (e.g. Torralba, A., Murphy, K. P. and Freeman, W. T. The MIT CSAIL Database of objects and scenes. http://web.mit.edu/torralba/www/database.html), or it may be different.

Figure 1:
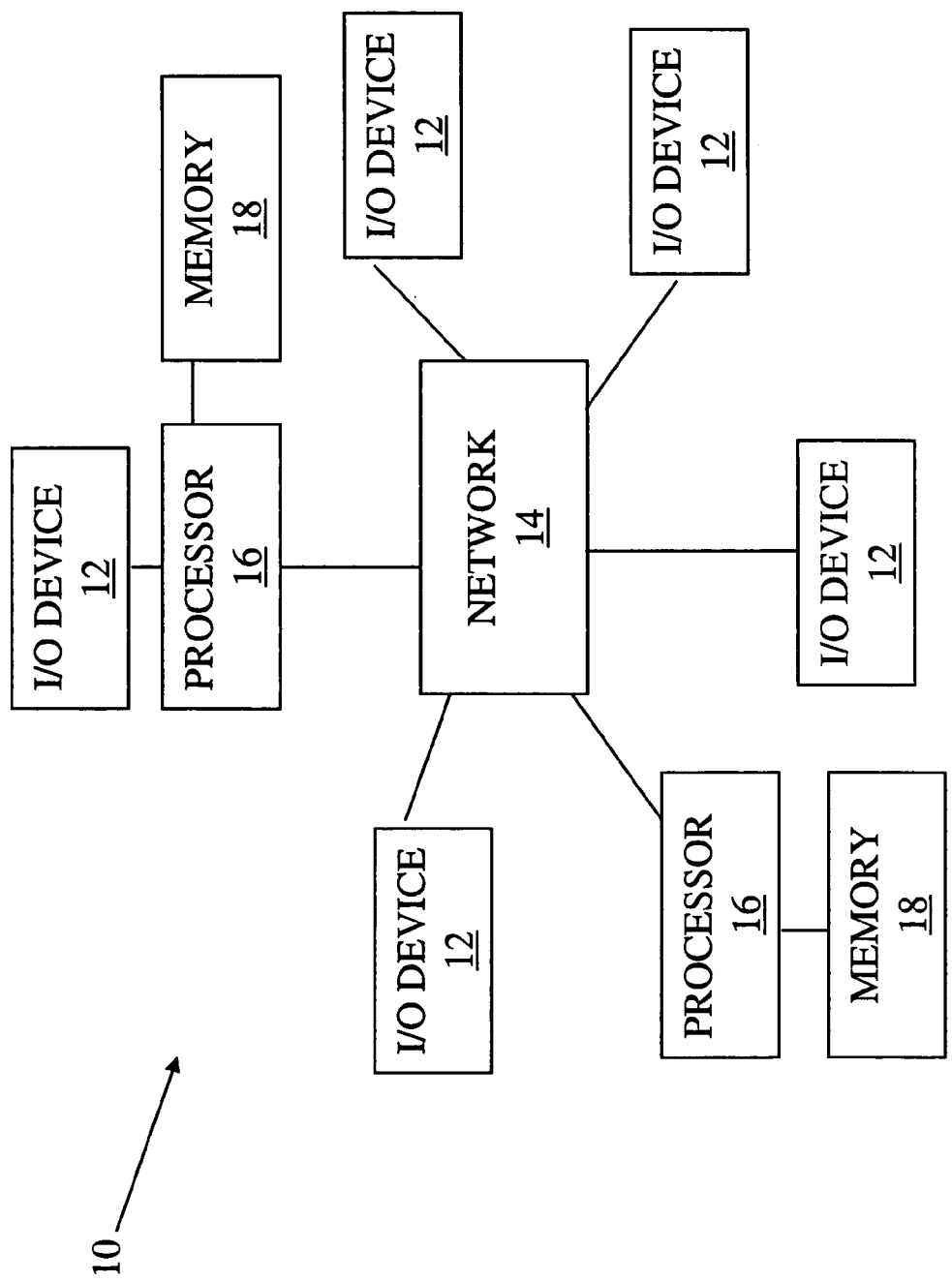
FIG. 1 illustrates one embodiment of a system according to the present invention.

FIG. 1 illustrates one embodiment of a system 10 according to the present invention. The system 10 includes several input/output devices ("I/O devices") 12 connected together through a network 14. The network 14 may be, for example, the Internet or some other public or private network. In another embodiment the network 14 may be direct connections between the I/O devices 12, such as cables or wires without using traditional network elements. Furthermore, the number, type, interconnection, and other characteristics of the I/O devices 12, network 14, and system 10 can vary according to the present invention. For example, processors 16 and memory devices 18 may be used with one or more I/O devices 12. Alternatively, one or more processors 16 and/or memory devices 18 may be used with or without I/O devices 12.

In one embodiment, processors 16 and memory devices 18 are connected to the network 14 without a local I/O device 12. Those processors 16 and memory devices 18 may be accessed, for example, through the network 14 from one or more of the other I/O devices 12 and may be used, for example, to process and store data according to the present invention or to operate and control the processes according to the present invention. More than one processor 16 and memory device may be used according to the present invention. In one embodiment, a processor 16 and memory devices 18 is used to control the operation of the game according to the present invention, and a different processor 16 and different memory device 18 is used to create, store, process, and access a database created according to the present invention. Additional processors 16 and memory devices 18 may also be used. Many variations of the present invention are possible. In other embodiments, the present invention may be implemented as a stand-alone machine with one or more I/O devices 12 and not relying on a network 14.

The I/O devices 12 may be all the same or they may be different. The I/O devices 12 may be, for example, terminals and keyboards or other interface devices. One or more of the I/O devices 12 may also include signal processors 16 and memory 18 and may be, for example, computers, such as general purpose computers, servers, or other types of computers. The I/O devices 12 may also include other components.

FIG. 1 illustrates the present invention embodied as a system 10 including a network 14 with several I/O devices 12. Some of the I/O devices 12 may be used by people utilizing the present invention (e.g., people playing a game according to the present invention on general purpose computers), other I/O devices 12 may be associated with processes controlling the operation of the present invention and the operation of the system 10 (e.g., servers controlling the interaction between players, collecting and processing data, and creating or updating databases according to the present invention), and some of the I/O devices 12 may be used by people performing other tasks not associated with the present invention (e.g., people communicating over the Internet). Although only one I/O device 12 is shown with a processor 16 and memory 18, other I/O devices 12 may also include processors 16, memory 18, as well as other components. Similarly, the other parts and elements of the present invention are subject to many variations and combinations, and the figures are illustrative of the present invention, and not limiting. For example, a system 10 may include more or less I/O devices than are illustrated in FIG. 1. Also, the present invention will sometimes be described in terms of "first" and "second" I/O devices 12, or in terms of more than two I/O devices 12. These "first", "second", and other I/O devices 12 may be, for example, any of the I/O devices 12 illustrated in FIG. 1, or they may all be the same I/O device 12, as will be described hereinbelow.

Signal processors 16 may also be included in other parts of the system 10 to control various aspects of the system's 10 operation. The signal processors 16 may work together or independently. Regardless of where they are located, the signal processors 16 may include computer readable instructions, such as in the form of software, firmware, and hardware, which when executed cause the signal processors 16 or other devices to operate in a particular manner and to cause signals to be processed in a particular manner. The computer readable instructions may be stored, for example, in one or more memory devices 18, which may or may not be shared by two or more processors 16 or other devices.

In one embodiment, one or more signal processors 16 are connected to the network 14 and also connected to one or more memory devices 18. The memory devices 18 include computer-readable instruction which, when executed, cause the system 10 to operate according to the present invention. For example, the processors 16 may cause a first I/O device 12 to display an image and cause the first I/O device 12 to receive an input indicative of a portion of the image to be displayed on a second I/O device 12. For example, the first I/O device 12 may prompt a person to select a portion of the image to be displayed to another person at a second I/O device 12. Thereafter, the same or a different processor 16 may cause the second I/O device 12 to display a selected portion of the image. The portion of the image displayed on the second I/O device 12 is less than all of the image and the portion of the image displayed on the second I/O device 12 is determined by the input received by the first I/O device 12. The second I/O device 12 then receives an input after the portion of the image is displayed. This is, for example, a guess as to what the portion of the image displayed at the second I/O device 12 represents. One of the processors 16 determines whether the input from the second I/O device 12 is related to the image.

Determining whether the input from the second I/O device 12 is related to the image means, for example, determining if the input from the second I/O device 12 is the same as one or more predetermined acceptable word answers. In some embodiments there may only be a single correct answer or only one word that is related to or properly corresponds to the image. In other embodiments, there may be more than one word that properly corresponds to the image. For example, the image may have several acceptable answers, such as synonyms included in the list of words that properly correspond to the image. Some or all of these words may be displayed at the first I/O device 12 so that a person at the first I/O device 12 can consider the "related" words when deciding which parts of the image to display at the second I/O device 12. Determining whether the input from the second I/O device 12 properly corresponds to the image may also include subsequent processing of the input at the second I/O device 12, such as to check for spelling errors. Alternatively, the list of acceptable answers may include the various misspellings of the acceptable terms.

If the input at the second I/O device is determined to be related to the image (e.g., the player guesses correctly), then a new image and related word are selected and the players repeat the process. If the guess is incorrect, addition guesses may be made, and hints or other information may be provided by the person at the first I/O device 12, as will be described in more detail hereinbelow. Many embodiments and modifications are possible with the present invention, and the particular operation of the system 10 may vary. For example, one or more of the I/O devices 12 may be used, for example, as a computer or "bot" to simulate a human participant in the present invention, as will be described in more detail hereinbelow.

Figure 2:
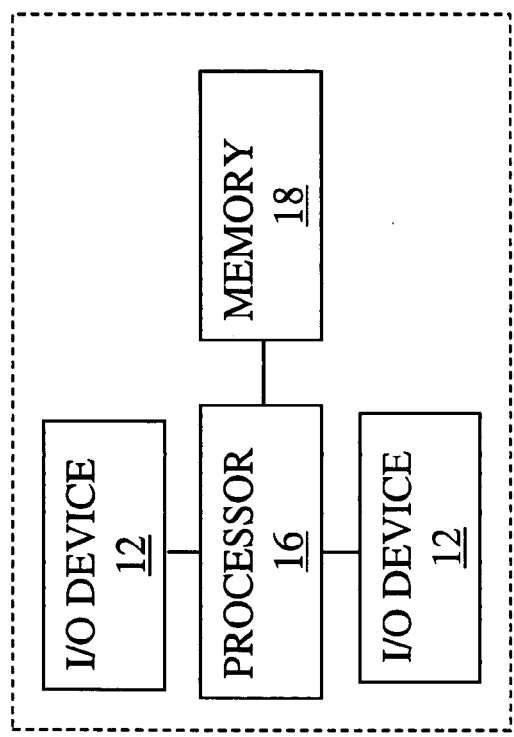
FIG. 2 illustrates one embodiment of an apparatus according to the present invention.

FIG. 2 illustrates one embodiment of an apparatus 20 according to the present invention. In that embodiment, the apparatus 20 includes two I/O devices 12, a processor 16, and a memory 18. This apparatus 20 may be connected to a network 14 or it may be a standalone apparatus. Many variations are possible with the apparatus 20. For example, the apparatus 20 may include more or less than two I/O devices 12. In some embodiments the apparatus 20 includes three or more I/O devices 12 so that, for example, three or more people can use the apparatus 20 at the same time. In other embodiments, the apparatus 20 includes only one I/O device 12, such as when only one person is using the apparatus and playing against a computer or "bot". Alternatively, more than one person can use an apparatus 20 with only one I/O device if, for example, the people take turns using the I/O device 12. Other variations are also possible. For example, the apparatus 20 may include more than one processor 16, more than one memory 18, and other components.

The memory devices 18 in the apparatus may include computer-readable instructions which, when executed, cause the processor 16 and the apparatus 20 to operate according to the present invention. For example, the processor 16 may cause the first I/O device 12 to display an image and cause the first I/O device 12 to receive an input indicative of a portion of the image to be displayed on the second I/O device 12. Thereafter, the processor 16 may cause the second I/O device 12 to display a portion of the image, wherein the portion of the image displayed on the second I/O device 12 is less than all of the image and wherein the portion of the image displayed on the second I/O device 12 is determined by the input received by the first I/O device 12. After the portion of the image is displayed on the second I/O device 12, the processor 16 may cause the second I/O device 12 to receive an input from the person at the second I/O device 12. The processor 16 determines whether the input from the second I/O device 12 is related to the image. The process continues as described herein and many variations are possible. For example, although the computer readable instructions were described in the context of two I/O devices 12, the computer readable instructions may be applied to an apparatus with only one I/O device, or to an apparatus with more than two I/O devices.

Figure 3:
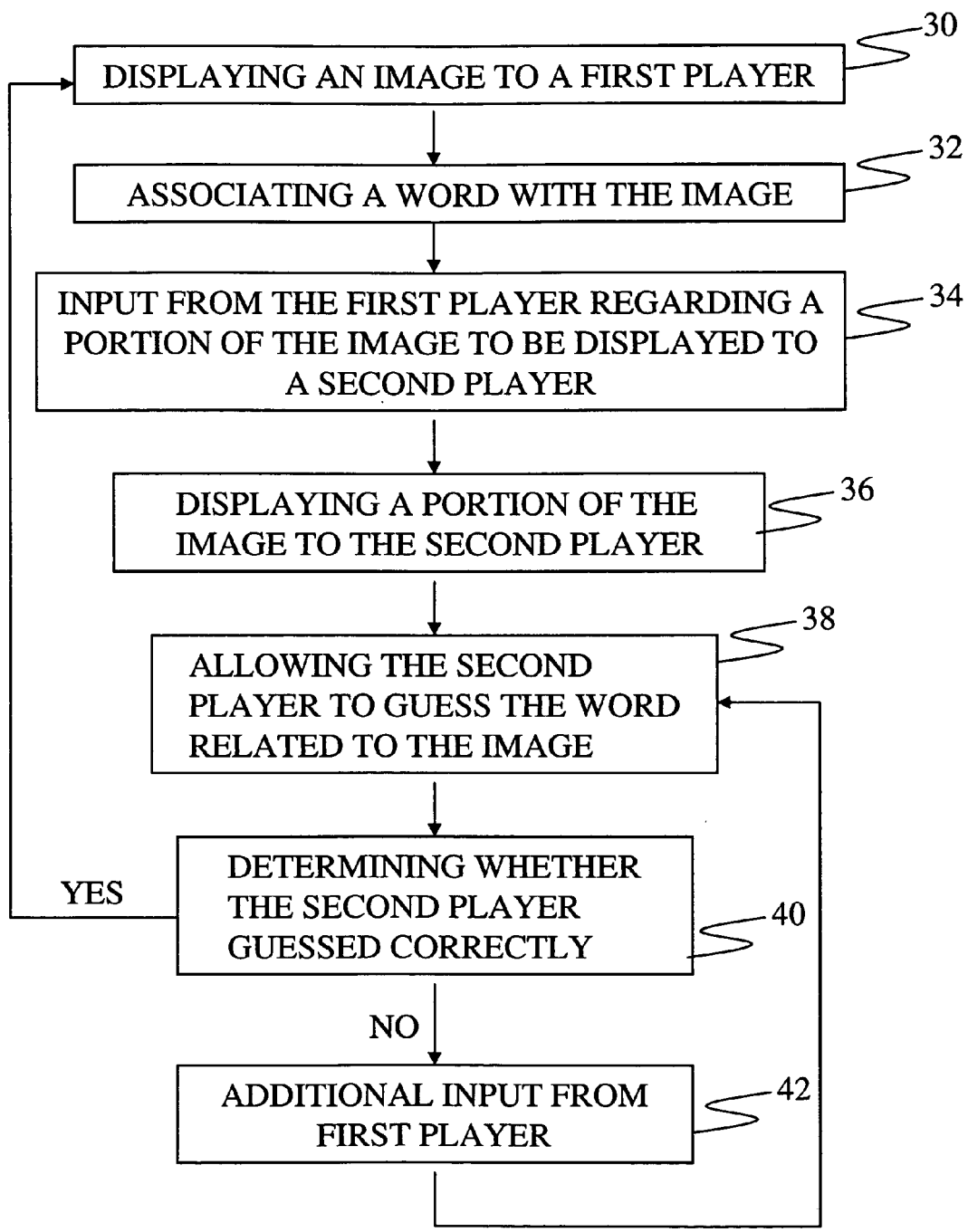
FIG. 3 is a flow diagram illustrating one embodiment of the present invention.

FIG. 3 is a flow diagram illustrating one embodiment of the present invention. The present invention will generally be described in the context of a process or game in which a first player causes a portion of an image to be displayed to a second player, and the second player tries to guess a word associated with the image.

The process begins by displaying an image to a first player 30. A word is also associated with the image 32, although this association may happen before or after the image is displayed to the first player 30. The word may be associated with the image prior to displaying the image to the first player and the image and word may be displayed to the first player at the same time. Alternatively, only the image may be displayed to the first player and the first player then associates a word with the image. For example, after seeing the image the first player may be prompted for and allowed to enter one or more words associated with the image. The image and the word are sometimes referred to as an "image-word pair".

Thereafter, the first player considers the image-word pair and selects a portion of the image to be shown to the second player 34. There are many ways in which the first player may select the portion of the image to show to the second player, as will be described in more detail hereinbelow.

Thereafter, a portion of the image is displayed to the second player 36 and the second player tries to guess the word related to the image 38. This may be accomplished, for example, by prompting the second player to enter a guess and allowing the second player to enter a guess through a computer, terminal, input/output device, or otherwise.

After the second player enters a guess 38, it is then determined whether the second player guessed correctly 40. For example, as described herein, an input from the second player may be compared to one or more words determined to be related to the image. If the second player guesses correctly, a new image 30 and word 32 are presented and play continues.

In some embodiments, the players switch roles after each correct answer. In other embodiments, the players continue in their roles for two or more turns.

If the second player did not guess correctly, the first player may provide additional input to assist the second player 42. For example, the first player may display additional portions of the image. Alternatively, the first player may give the second player hints, indicate whether the guess is "hot" or "cold", "ping" a particular part of the image displayed to the second player, or provide some other input. As used herein, "ping" means to draw attention to a particular part of the image seen by the second player. For example, "pinging" may cause a portion of the image seen by the second player to be highlighted, to flash or move, to be circled, to ripple, or to otherwise draw attention to a particular part of the image. Alternatively, the second player may be allowed to submit more guesses before the first player provides additional help. It is also possible for the present invention to eliminate additional help from the first player. For example, the second player is allowed one or more guesses, and if the correct word is not guessed, the game continues with a new image and word pair without further input from the first player.

The first and second player, as described with reference to FIG. 3, may be located at two different I/O devices 12 connected by a network 14 as illustrated in FIG. 1. In that embodiment, one or both of the I/O devices 12 may include a processor 16 and memory 18 to control the interaction between the players. Alternatively, a third device, such as a server or general purpose computer connected to the network or one of the I/O devices may be controlling the interaction between the players. In yet another embodiment, one of the players may be human and the other player may be a computer or a "bot". The computer or bot player may be represented as one of the I/O devices in FIG. 1, or it may be controlled by a processor in the I/O device of the human player. Many other variations are possible. Similarly, the first and second players may be located at the two I/O devices illustrated in the apparatus of FIG. 2. If a bot is playing the role of a player, the bot may, for example, be controlled from the processor in the apparatus.

Figure 4:
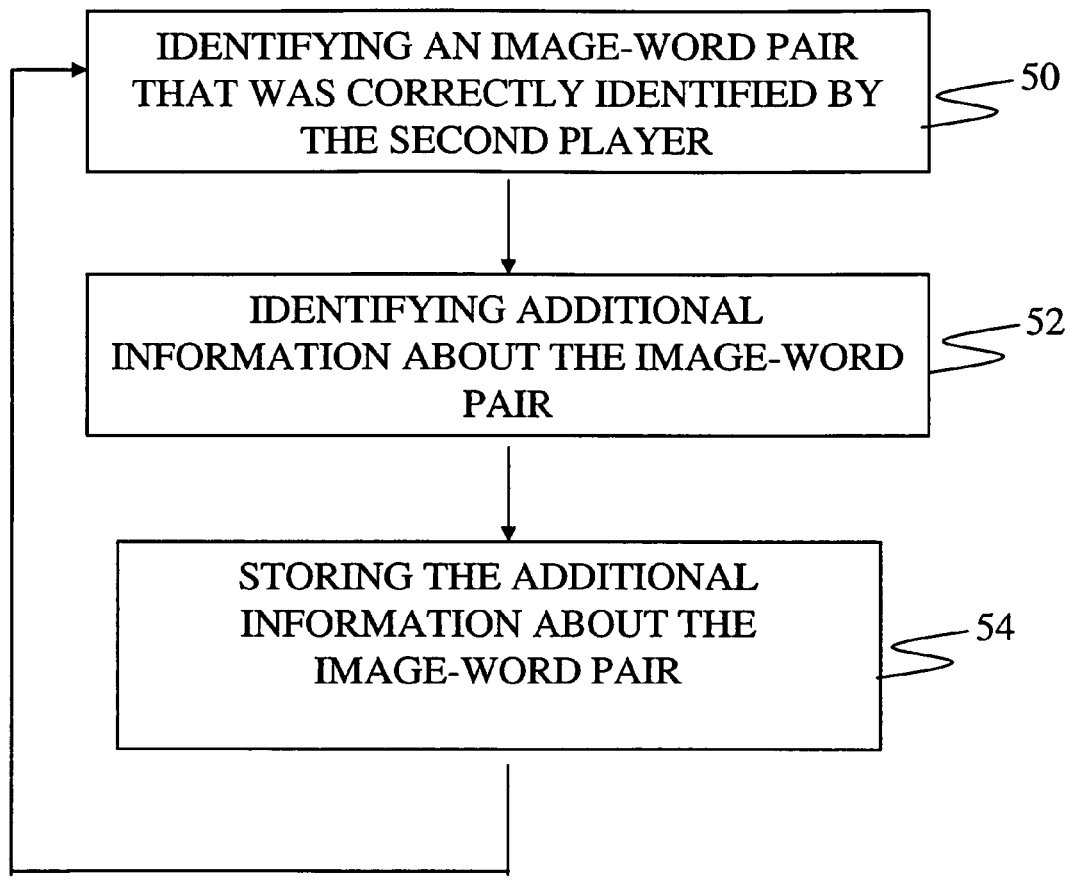
FIG. 4 is a flow diagram illustrating one embodiment of the present invention

FIG. 4 is a flow diagram illustrating one embodiment of another aspect of the present invention in which additional information about image-word pairs is captured and stored. This process may be performed at the same time as the process described with reference to FIG. 3 or it may be performed at a later time with data from the process described with reference to FIG. 3. The information may be stored, for example, in a database, and used later, such as for training computer vision algorithms or for other purposes. The information may be stored in a memory 18 at one or more of the I/O devices 12 used by the players or it may be stored in some other memory 18, such as a memory 18 connected to the network 14. In one embodiment, a processor 16 and memory 18 are connected to the network 14 and they process data as it is generated by the players and produce or update a database with the information.

In the illustrated embodiment, the process begins with identifying an image word pair that has been correctly identified by the second player 50. From these image-word pairs, additional information is identified or captured 52. For example, the particular portion of the image that was revealed to the second player before the second player correctly guessed the word can be used to identify the particular portions of the image corresponding to the word related to the image. For example, if the image includes a cow and the word is "cow", then the first player may have exposed some or all of the cow to the second player. As a result, the exposed portion of the image can be used to supplement the information known about the image-word pair, namely the location of the particular object in the image. In addition, information such as parts of the image that were "pinged" can be used to identify those portions of the image that are particularly important for identifying the object. Other information can also be identified or captured, as will be described in more detail hereinbelow. After the information of interest is identified, it can be saved along with the image-word pair or separate from the image-word pair 54. The information may be saved in a database or in other forms for later use.

Figure 5:
FIG. 5a illustrates one embodiment of a display shown to the "peek" player according to the present invention.
FIG. 5b illustrates one embodiment of a display shown to the "boom" player according to the present invention.

Many variations are possible with the present invention. The present invention will be described in terms of a game called "Peekaboom", although the present invention may be implemented in other games or in applications or processes other than games. Peekaboom, as the name may suggest, is a game with two main components: "Peek" and "Boom." In one embodiment, people desiring to play Peekaboom go to a predetermined Internet site. Once at the Internet site, the players play the game with a computer (e.g., "bot") or are arranged into groups of two or more humans to play the game. The players participate by taking different roles. For example, one or more players are Peek and one player is Boom. Peek starts out with a blank screen, while Boom starts with an image and a word related to it (see FIG. 5).

The goal of the game is for Boom to reveal parts of the image to Peek, so that Peek can guess the associated word. In one embodiment, Boom reveals circular areas of the image by clicking on the image. A click reveals an area with a 20-pixel radius. Peek, on the other hand, can enter guesses of what Boom's word is. Boom can see Peek's guesses and can indicate whether they are hot or cold. Many variations are possible with the present invention. In some embodiments the image is revealed in circular areas. In other embodiments, the area of the image revealed by Boom may be rectangular, triangular, irregular, or otherwise. The size of the area revealed can also vary and may be more or less than a 20-pixel radius. Similarly, many variations of follow-up actions are possible with the present invention. For example, in addition, to indicating whether Peek is "hot" or "cold", Boom may give hints or may "ping" a portion of the image to draw it to Peek's attention. Those and other variations are possible with the present invention.

When Peek correctly guesses the word, the players get points and switch roles. Play then proceeds on a new image-word pair. If the image-word pair is too difficult, the players can "pass" or opt out of the current image and move to the next image. Passing creates the same effect as a correct guess from Peek, except that the players get no points.

To maximize points, Boom has an incentive to reveal only the areas of the image necessary for Peek to guess the correct word. For example, if the image contains a car and a dog and the word associated to the image is "dog", then Boom will reveal only those parts of the image that contain the dog. Thus, given an image-word pair, data from the game yield the area of the image pertaining to the word.

Figure 6:
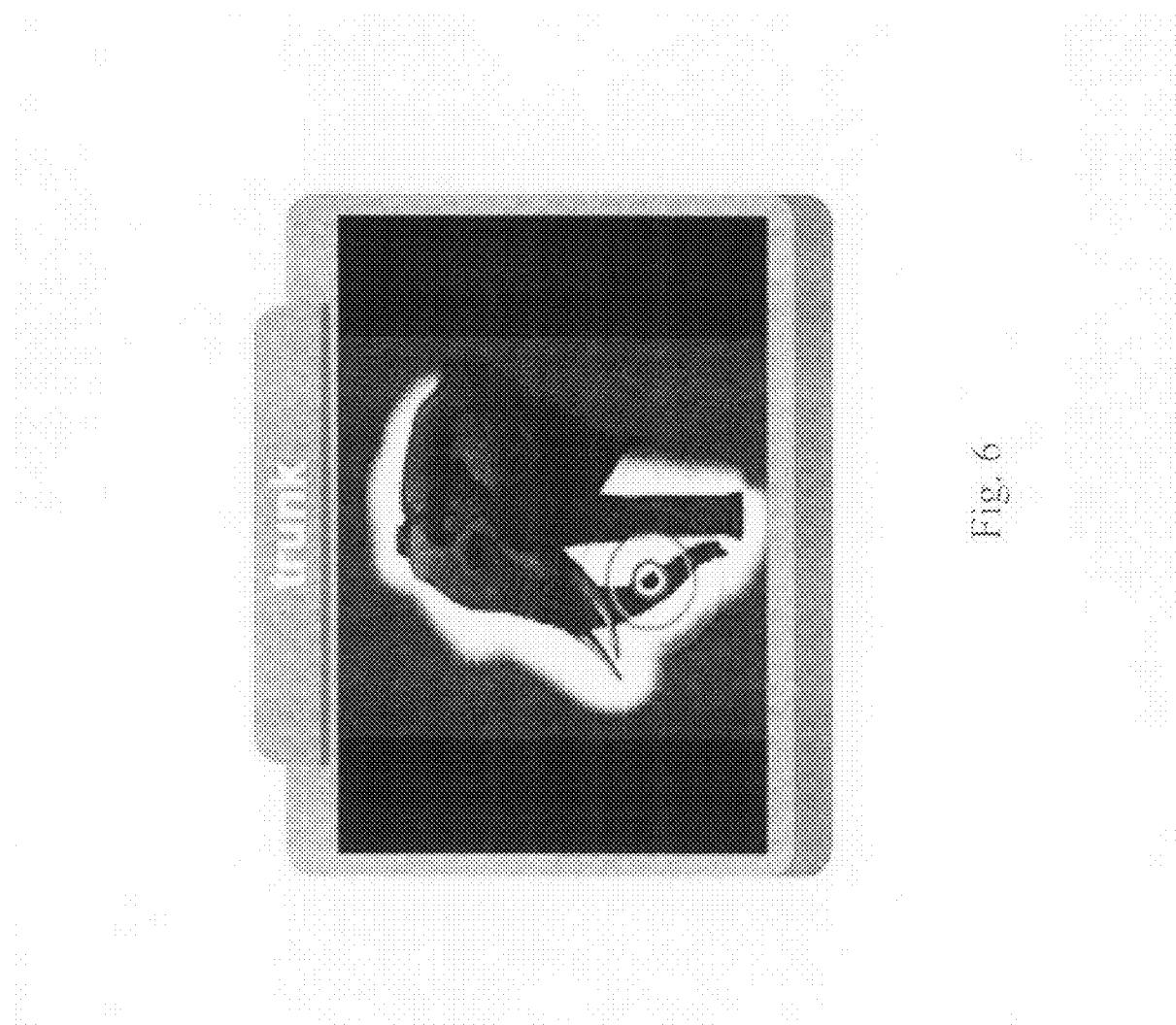
FIG. 6 illustrates one embodiment of a display shown to the "peek" player when the "ping" function is used according to the present invention.

According to one embodiment of the present invention, Boom may use "pings" to draw Peek's attention to particular parts of the image. For example, a ping may cause ripples to appear on Peek's screen when Boom right-clicks on the image (see FIG. 6). If two players were playing with the image on FIG. 6, then many correct words are possible from Peek's point of view: elephant, trunk, tusk, ear. Suppose the correct word is "trunk." To get Peek to guess correctly, Boom can "ping" the trunk of the elephant by right-clicking on it. In doing so, Boom helps to disambiguate the trunk from the rest of the elephant. When Boom pings a particular part of an image, that data can be used to identify particularly relevant parts of the image for training computer vision algorithms.

According to another embodiment of the present invention, Boom may give hints to Peek. For example, Boom may give hints to Peek about how the word relates to the image (See FIGS. 5 and 7). Upon Boom's pressing of one of the hint buttons, a corresponding flashing placard appears on Peek's screen. The reason for having hints is that often the words can relate to the image in multiple ways: as nouns, verbs, text, or related nouns (something not in the image, but related to it).

According to another embodiment of the present invention, Boom may be prevented from revealing one or more predetermined portions of the image to Boom. For example, it may be desirable to prevent the players from revealing obvious parts of an image, such as a face of a human being or an animal, in order to gather new or additional information that would not be available if obvious game playing strategies were available. By preventing Boom from revealing those parts of the image, the players are forced to consider secondary or other features that define or otherwise relate to an object.

The Origin of Images and Labels

The game described herein uses image-word pairs. In other words, the game uses an image and one or more words associated with that image. For example, the word may identify or describe an object in the image, or it may describe an action taking place in the image, or it may describe some other thing associated with the image. The image-word pair can be thought of as an input to the game. On input an image-word pair, Peekaboom outputs a region of the image that is related to the word.

The image-word pair may be obtained from a third party source or it may be generated as is known in the prior art. In one embodiment, images with associated keyword labels are obtained from the ESP Game (von Ahn, L., and Dabbish, L. Labeling Images with a Computer Game. In *ACM Conference on Human Factors in Computing Systems (CHI)*, 2004, pages 319-326). The ESP Game is a two-player online game that pairs random players from the Web. From the player's perspective, the goal of the ESP Game is to guess the word that their partner is typing for each image. Once both players have typed the same string, they move on to a next image. Since the players can't communicate and don't know anything about each other, the easiest way for both to type the same string is by typing something related to the common image. The string upon which the two players agree is a very good label for the image. The labels and associated images collected from the ESP Game can be used as the image-word pairs in the present invention.

In another embodiment, images are obtained and one of the players provides the word label for the image. For example, an image is displayed to one of the players, and that player types a word associated with the image, and the other player attempted to guess the word.

Game Points and the Bonus Round

Although the exact number of points given to the players for different actions in the present invention is not important, examples will be given. Different point strategies may be used to keep players engaged and to achieve certain goals.

Points are given to both Peek and Boom equally whenever Peek guesses the correct word. In one embodiment, both obtain 50 points. Points are not subtracted for passing. Points are also given to both Peek and Boom for using the hint buttons. Although this might appear counterintuitive since using hints deducts points in many other games, additional useful information can be gained when the players to use the hint buttons. As mentioned above, hints give us additional information about the relationship between the word and the image. Twenty-five extra points are given to both Peek and Boom whenever Peek guesses the correct word and Boom had used a hint. Points are not given for usage of the hot/cold buttons.

In one embodiment, every time the players correctly complete four images, they are sent to a "bonus" round. The bonus round is different in nature from the rest of the game and allows players to obtain up to 150 points. In the bonus round (see FIG. 8), players simply click on an object in the image. The closer they are to each other's clicks, the more points they get. For example, both players could obtain an image of a car and be told "click on the car."

Players obtain between 0 and 10 points for every click in the bonus round, depending on how far the click is from their partner's corresponding click. The bonus round is timed: players have to click on the same place as their partner as many times as they can in 5 seconds. If the object is not in the image, players can pass. Because some images do not contain the object related to the word, passing in the bonus round generates 25 points for both players (so we can learn whether the object is there). Players cannot pass after they have clicked on the image.

There are several advantages to a bonus round according to the present invention. First, by giving players "bite-size" milestones (for example, getting four images correctly), we reinforce their incremental success in the game and thus encourage them to continue playing. Second, the bonus round is an alternative approach to collecting training data for computer vision. In it, players click inside specific objects within an image. Such clicks give additional information for training computer vision algorithms.

Collecting Image Metadata

One advantage of the present invention is to construct a database for training computer vision algorithms. The following is one example of the information collected by Peekaboom and how it is collected. On input of an image-word pair, Peekaboom collects information on how the word relates to the image, about the pixels necessary to guess the word, about the pixels inside the object, animal, or person, about the most salient aspects of the objects in the image, and about the quality of the image-word pairs.

Figure 7:
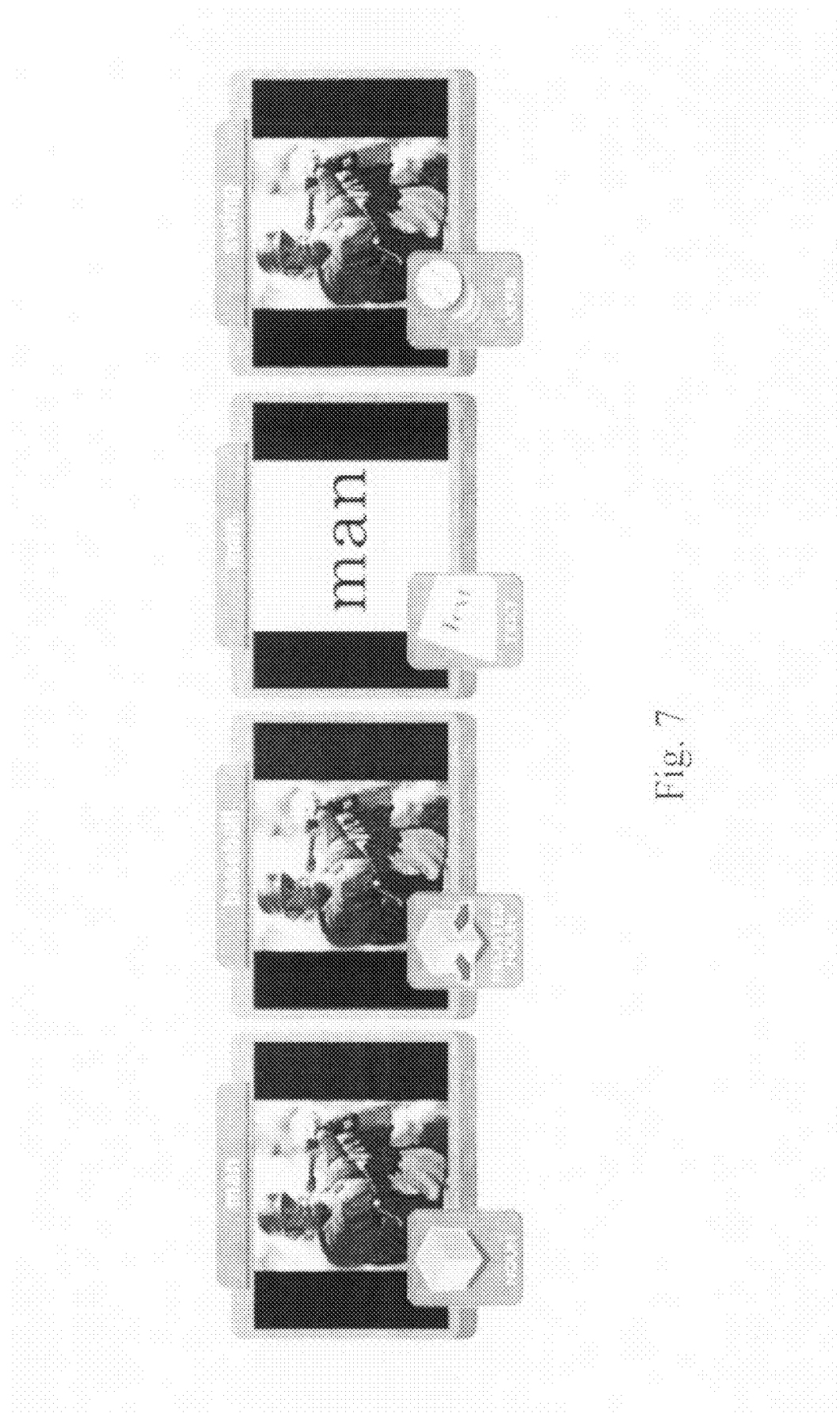
FIG. 7 illustrates one embodiment of a display showing "hints" according to the present invention.

The present invention allows for the collection of information on how the word relates to the image. For example, is it an object, a person, or an animal in the image? Is it text in the image? Is it a verb describing an action in the image? Is it an object, person, or animal not in the image but related to it? This and other information can be gathered. The ESP Game associates words to images, but does not say how the word is related to the image. FIG. 7, for instance, shows multiple ways in which a word can be related to an image. Hint buttons in Peekaboom allow us to determine the relation of the word to the image. This is useful in multiple ways, but for the purposes of constructing training sets for computer vision, it allows us to weed out "related nouns" and to treat "text" separately.

Figure 9:
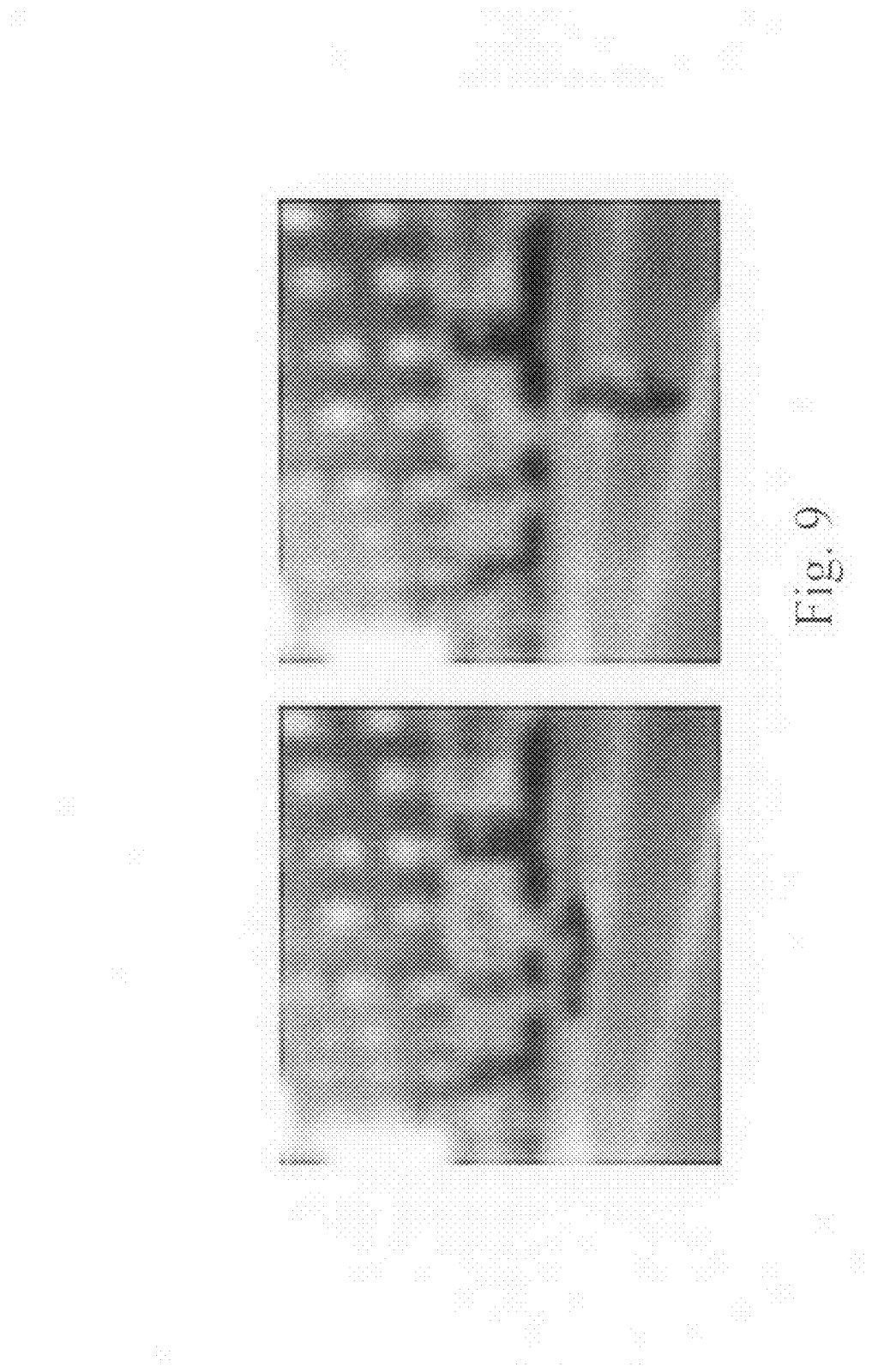
FIG. 9 illustrates one embodiment of how the same set of pixels can represent different objects in an image.

The present invention allows for the collection of information on the pixels necessary to guess the word. When Peek enters the correct word, the area that Boom has revealed is precisely enough to guess the word. That is, we can learn exactly what context is necessary to determine what the word refers to. This context information is absolutely necessary when attempting to determine what type of object a set of pixels constitutes (see FIG. 9).

The present invention allows for the collection of information on the pixels inside the object, animal, or person. If the word is a noun directly referring to something in the image, "pings" give us pixels that are inside the object, person, or animal.

The present invention allows for the collection of information on the most salient aspects of the objects in the image. By inspecting the sequence of Boom's clicks, we gain information about what parts of the image are salient with respect to the word. Boom typically reveals the most salient parts of the image first (e.g., face of a dog instead of the legs, etc.).

The present invention allows for the collection of information on the quality of the image-word pair. If many independent pairs of players agree to pass on an image without taking action on it, then likely they found it impossibly hard because of poor picture quality or a dubious relation between the image and its label. By implementing an eviction policy for images that we discover are "bad," we can improve the quality of the data collected (as well as the fun level of the game).

When multiple players have gone through the same image, these pieces of information can be combined intelligently to give extremely accurate and useful annotations for computer vision. Later in the paper, for example, we show how a simple algorithm can use the data produced by Peekaboom to calculate accurate object bounding-boxes (see FIG. 11).

The present invention has generally been described in terms of a two player game in which one player has the role of "Peek" and the other player has the role of "Boom". Other embodiments are also possible with the present invention. For example, more than one player may have the role of "Peek", with each "Peek" player guessing independent of the other "Peek" players. In other embodiments, one or more artificial intelligence players (e.g., server-side "bots") may participate. For example, a single human may play the game with one or more bots. Allowing a single human to play the game is useful when, for example, there is an odd number of people attempting to play the game and one person cannot be paired.

In one embodiment, the bot acts intelligently to simulate a human player by being based on pre-recorded games. In other words, data collected from pairs of humans is used as the basis for the computer player's logic. Emulating a Boom player is fairly simple. For example, the bot can regurgitate the sequence of recorded clicks to the human. Emulating Peek is more complicated because the bot needs to have some concept of closeness of the human's clicks to the set of recorded clicks. For instance, if the human does not reveal the dog in the picture, the bot should not guess "dog." In some embodiments, the bot only reveals a certain pre-recorded guess if enough area has been revealed. Towards this end, it employs a spatial data structure whose members are circles, each of which corresponds to a click. Elements of the data structure are removed as they are clicked on by the human player. When the data structure becomes empty, the bot gives the correct answer. Moreover, it has the ability to make incorrect guesses along the way, based on the relative emptiness of the spatial data structure.

In one embodiment, Peekaboom is a collaborative game. In other words, partners work together to maximize their score. When both partners do not communicate outside the game environment, we obtain correct information. However, if the two partners collude to cheat on the game, the data could be poisoned. For instance, if Boom and Peek know each other and have an outside means of communication, then Boom can simply tell Peek what words to type.

The present invention may use various anti-cheating mechanisms. Through a combination of online in-game enforcement and offline analysis, cheating can often be detected.

On method of preventing cheating is through the utilization of an appropriate player queue. For example, when players log on to the game server, they are not immediately paired off. Instead, the server makes them wait n seconds, where n is the number of seconds until the next matching interval. In one embodiment, the matching intervals happen every 10 seconds, and when they do, the server matches everyone in the queue with a partner (any odd person out will be paired with a bot or paired in the next matching interval). With a large number of players in the system 10, there is a high probability that a player's partner is random and prevent colluders from getting matched just because they clicked "start playing" at the same time.

Another method of preventing cheating is to check IP addresses. For example, players' IP addresses can be checked to ensure that they are not paired with themselves or with others that have a similar address (similarity in IP addresses can imply geographical proximity).

Another method of preventing cheating is to use "seed" images. The use of seed images is particularly useful when the present invention is implement on the Internet or in other implementations where it is difficult to know whether a human is actually providing the input. As a result, one point of concern is that bots (i.e. automated players) might play the game and pollute the pool of collected data. To detect bots, seed images can be used. "Seed" images are those for which there is hand-verified metadata. On being presented seed images, if a player consistently fails to click on the relevant parts when playing Boom or to guess the correct words when playing Peek, it will be assumed they are a bot or are otherwise providing intentionally invalid data. As a result, those players may be added to a blacklist and/or the data they provide in the past, present, and future may be discarded. Almost by definition, a computer program cannot successfully play Peekaboom. If bots were able to do so, then it would be able to recognize the objects in the images. Therefore, this strategy prevents bots (as well as otherwise malicious players) from poisoning the data.

Another method of preventing cheating is to limit the ability of "Peek" to enter guesses. Because Boom can see all of Peek's guesses, the game allows a limited form of communication between the players. Indeed, many of the Peekaboom players use the guess field as a way to communicate with their partner. It is not uncommon for the first guess in a game to be "hi" or for the first guess after passing on an image to be the correct word associated with the previous image. It is also not uncommon for players to type "sorry" after taking too long on an image. A possible cheating strategy is to exchange IM screen names through the guess field and then, using IM, communicate the correct words. According to one embodiment of the present invention, this form of cheating can be mitigated by not allowing Peek to enter any non-alphabetical characters (such as numbers). According to another embodiment, Boom can be prevented from seeing any guesses that are not words in the dictionary. However, even if players are successful in such a strategy, the other anti-collusion mechanisms can deal with the corrupted data.

Another method of preventing cheating is to aggregate data from multiple players. In other words, an image-word pair may be shown to many players and that data can be aggregated for the given image-word pair. By doing this, the effects of cheating and intentional incorrect data can be mitigated.

Implementation

The present invention can be implemented in many ways. According to one embodiment, the architecture of the game is implemented under the client-server model. The client application is delivered as a Java applet, while the server is written purely in Java. Applets connect to a server, http://www.peekaboom.org, which then matches the players with games of Peekaboom. Upon two players' completion of a match, the server writes their game play data and scores to disk. We then compile the collected data into desired formats.

This particular implementation of the game contains many features to improve game-play. For example, features such as spell checking, inappropriate word replacement, and top score lists and ranks are possible.

One feature available with the present invention is spell checking. For example, incorrectly spelled words are displayed in a different color to notify players. This is important because the Peek player usually types multiple guesses in a short time, often making spelling mistakes.

Another feature available with the present invention is inappropriate word replacement. Because Boom can see Peek's guesses, we do not allow Peek to enter inappropriate words. Whenever one of Peek's guesses is among a list of possible inappropriate words, we substitute it with another word chosen from a list of innocent words such as "love," "caring," "ILuvPeekaboom," etc.

Figure 10:
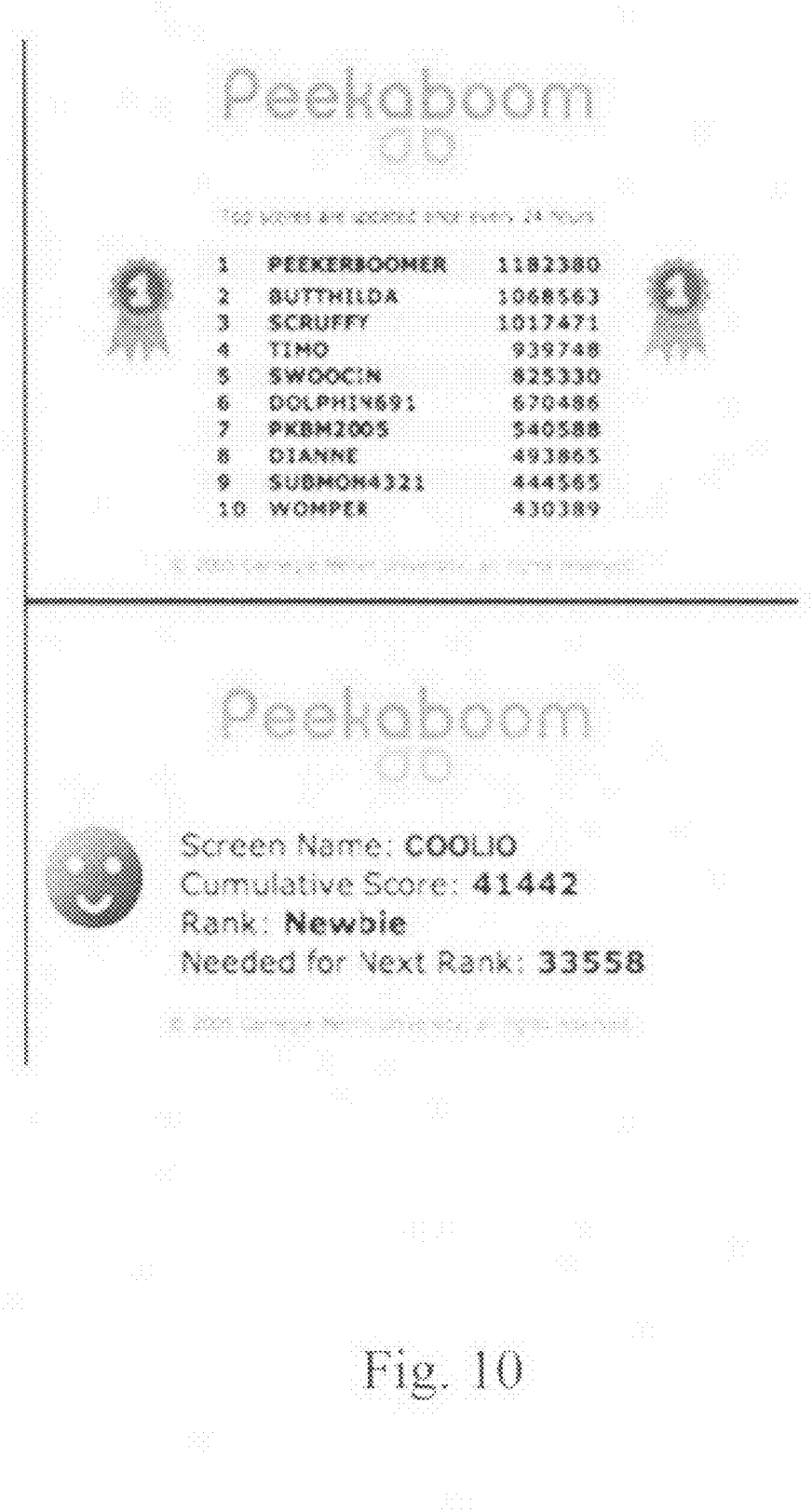

Another feature available with the present invention is top score lists and ranks. The Peekaboom website prominently displays the cumulative top scores of the day as well as the top scores of all time. Furthermore, players are given a rank based on the total number of points they have accumulated throughout time (see FIG. 10). The different ranks are: Fresh Meat (0-15,000 points), Newbie (15,000-75,000 points), Player (75,000-250,000 points), Gangster (250,000-1,000,000 points) and Godfather (1,000,000 or more points).

Ranks have proven an important component of Peekaboom's incentive strategy. Of the 15,000+ players that have obtained an account, 47% of them have scores that fall within 5,000 points of the rank cutoffs. Given that these intervals cover less than 2% of the space of possible cumulative scores, this strongly suggests that many players simply play to reach a new rank.

Additional Applications

The present invention allows for data collection for applications other than for training computer vision algorithms. For example, the present invention may be used for improving image-search results and for object bounding boxes. A benefit of these additional applications is that they are "direct" in that they do not require the training of machine learning algorithms.

With regard to improving image-search results, the present invention gives an accurate estimate of the fraction of the image related to the word in question. This estimate can be calculated from the area revealed by Boom. The fraction of the image related to a word can be used to order image search results: images in which the word refers to a higher fraction of the total pixels should be ranked higher. Much like the goal of the ESP Game is to label all images on the Web, we can imagine Peekaboom doing the same and thus further improving image-search.

Figure 11:
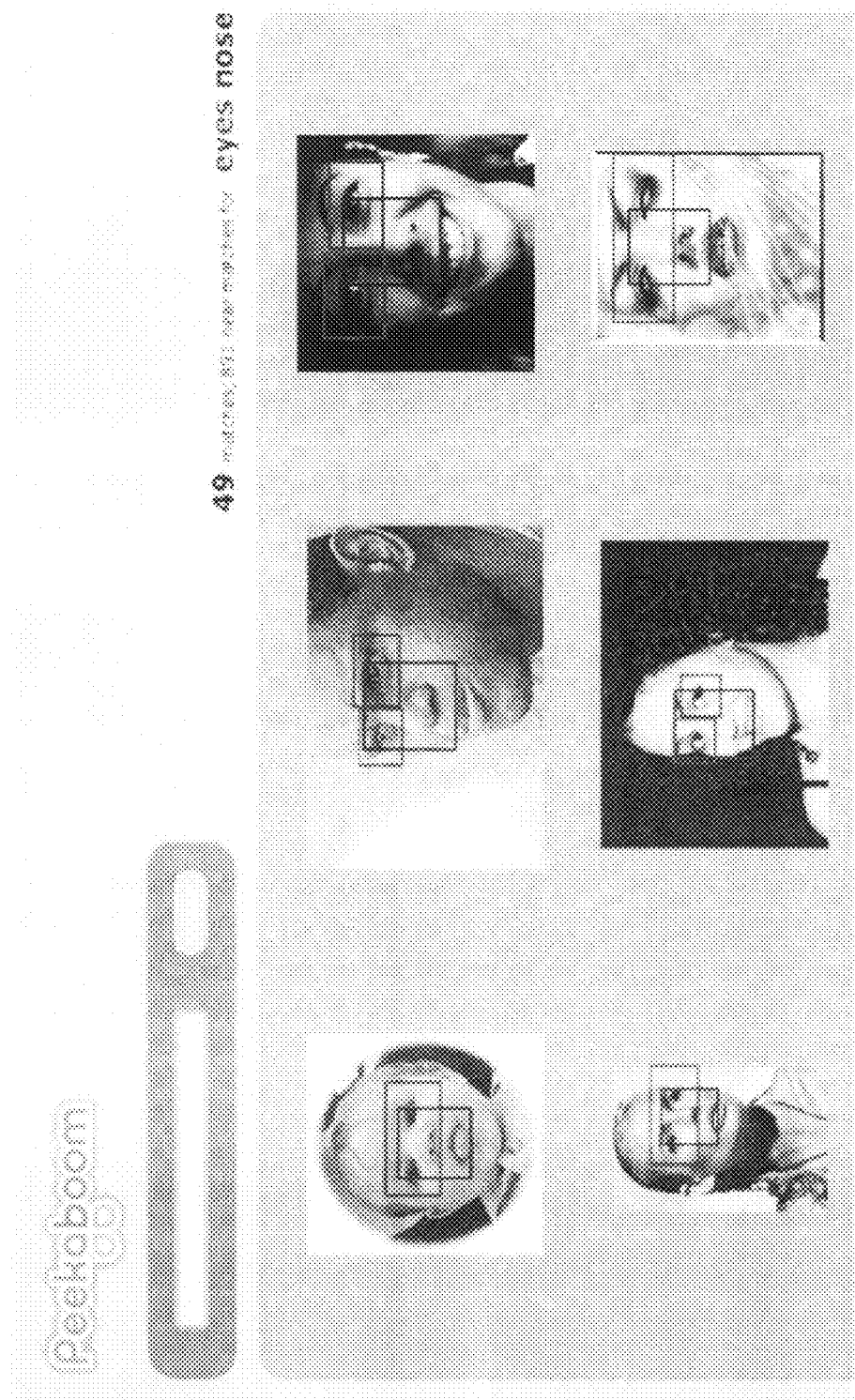
FIG. 11 illustrates one embodiment of a display showing bounding boxes.

With regard to object bounding boxes, the present invention can be used to directly calculate object bounding-boxes similar to those used in Flickr (Flickr Photo Sharing Service. http://www.flickr.com) (see FIG. 11). Flickr is a photo sharing service that allows users to "tag" images with keywords and to associate keywords with rectangular areas in the image (the areas and tags, however, are not guaranteed to be correct since a user can enter anything they wish for their own images). To exhibit the power of the data collected by Peekaboom, we show how to use it calculate such rectangles. However, the data collected by Peekaboom is significantly richer and, in order to calculate the rectangles, significant information collected by the game is discarded.

Because Peekaboom annotates arbitrary images on the Web, its data allows for an image search engine in which the results are highlighted (similar to the highlighted words in Google's text search results). Using the data obtained in the first two weeks of game-play, we have implemented a prototype of such a search engine (see FIG. 11). The search engine can be accessed from the Peekaboom website: http://www-.peekaboom.org.

The bounding boxes were calculated as follows. For a single play of an image-word pair, we create a matrix of 0s and 1s. The dimensions of the matrix are the same as the dimensions of the image (in pixels). At first, every entry in the matrix is a 0. We add a 1 in every pixel clicked by Boom, as well as in the circle of radius 20 pixels around the click. We thus obtain a matrix of 0s and 1s corresponding to the exact area that was revealed in a single game-play. Next, we combine different plays of the same image-word pair by adding their corresponding matrices. This gives a matrix whose entries are integers corresponding to the number of different players that revealed each pixel of the image. On this combined matrix, we apply a threshold of 2, meaning that we substitute every value less than 2 with 0 and every value greater than 2 with 2. This gives a matrix corresponding to all the pixels that have been revealed by at least 2 players.

Next, we cluster these pixels and calculate rightmost, topmost and bottommost points. This algorithm may produce multiple bounding-boxes for a single imageword pair. For instance, in FIG. 11, we can see that many of the results for "eyes" have two-bounding boxes, one corresponding to each eye.

As we will see, the results produced by this simplistic algorithm are extremely accurate. Such results could be improved by making intelligent use of the additional data given by Peekaboom (such as pings, the precise order of the areas revealed, etc.), but for the purposes of this paper, we use the simplistic algorithm.

Figure 12:
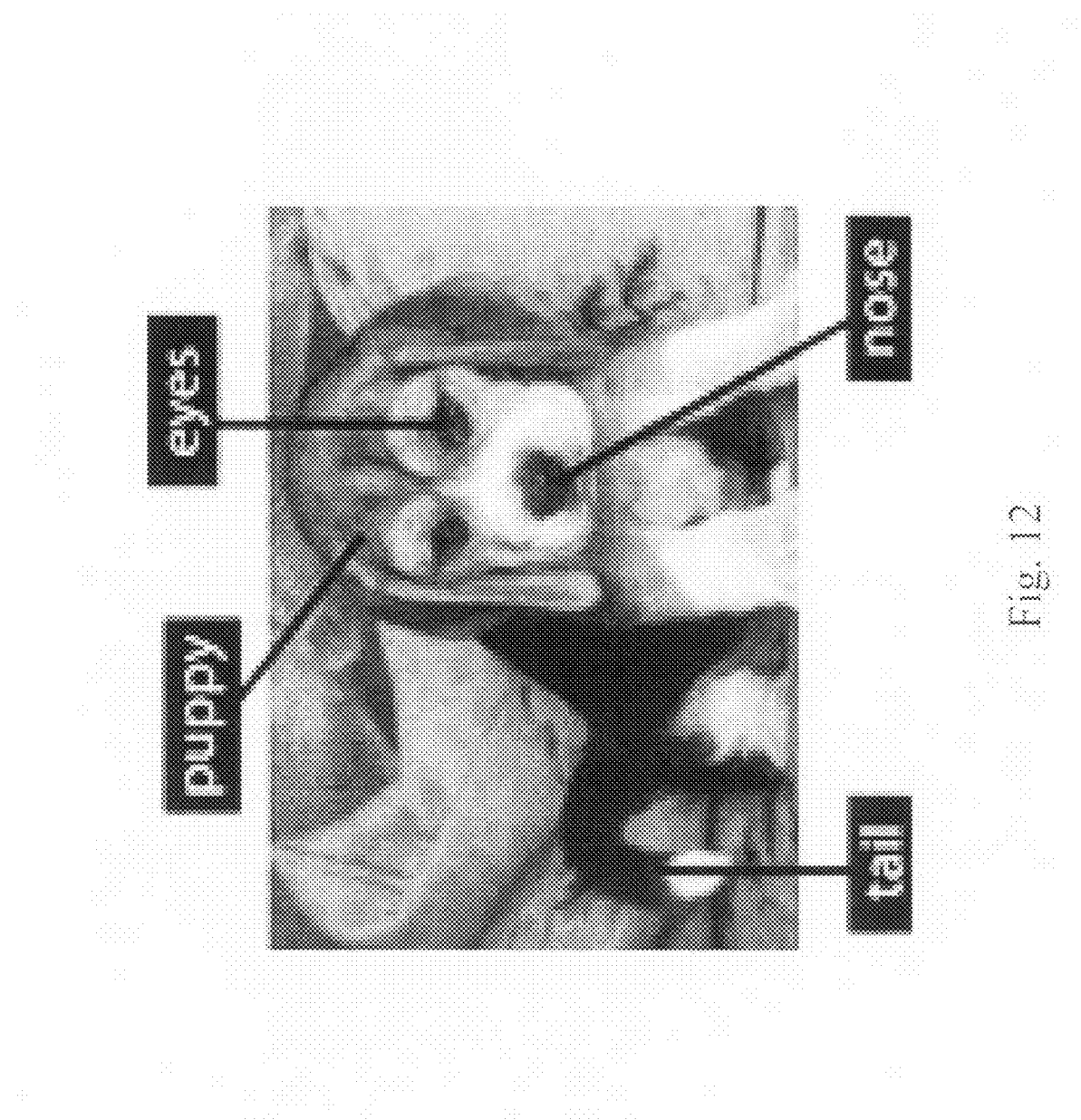
FIG. 12 illustrates one embodiment of a display showing pointers to different objects in an image.

Instead of showing bounding-boxes calculated from revealed areas, we could show arrows or lines pointing to the objects (see FIG. 12). Such pointers can be easily calculated from the ping data. The simplest algorithm for doing so is to select a ping at random and assume it is a good pointer for the object. We will show that this simplistic algorithm gives very accurate results. FIG. 12 shows an image in which the different objects have been located using ping data. More elaborate algorithms could give even better results. We remark, however, that simply "averaging" the pings over multiple players to obtain a single pointer does not give accurate results. For instance, if the object was "eyes," averaging the pings gives a pointer to a region that is not an eye.

The usefulness of the present invention as a data-collection method may be measured in the quality of the data collected. Two experiments were conducted to test the accuracy of the bounding boxes defined, and to test the utility of the pointing behavior in the game. These experiments are meant to analyze the correctness of the data, and not whether such data can be used to train computer vision algorithms. The usefulness of data about location of objects for training computer vision algorithms has been previously established (Torralba, A., Murphy, K. P. and Freeman, W. T. The MIT CSAIL Database of objects and scenes. http://web.mit.edu/torralba/www/database.html).

Experiment 1

Accuracy of Bounding Boxes

In the first experiment, we tested whether the bounding boxes for objects within an image that are calculated from Peekaboom are as good as bounding boxes people would make around an object in a non-game setting. We selected at random 50 image-word pairs from the data pool that had been successfully played on by at least two independent pairs of people. The images selected all had nouns as their word (as opposed to text in the image, or an adjective, etc.; see FIG. 7). All the images chosen had the word refer to a single object in the image. For each image, Peekaboom data was used to calculate object bounding boxes using the method explained in previous sections.

We then had four volunteers make bounding boxes around the objects for each image, providing us with 200 bounding boxes drawn by volunteers. The volunteers were asked, for each image, to draw a bounding box around the object that the word referred to. We then selected at random one of the four volunteer's bounding boxes for each image, so as to end up with one volunteer-generated bounding box for every one of the 50 images.

Finally, we tested the amount of overlap between the Finally, we tested the amount of overlap between the bounding boxes generated by Peekaboom and those generated by our volunteers. The amount of overlap was determined using the formula:

$$\text{OVERLAP}(A,B) = \text{AREA}(A \cap B)/\text{AREA}(A \cup B),$$

where A and B are the bounding boxes. Notice that if A=B then OVERLAP(A,B)=1 and if A is disjoint from B then OVERLAP(A,B)=0. We calculated the average overlap across the 50 images, as well as the standard deviation.

Figure 13:
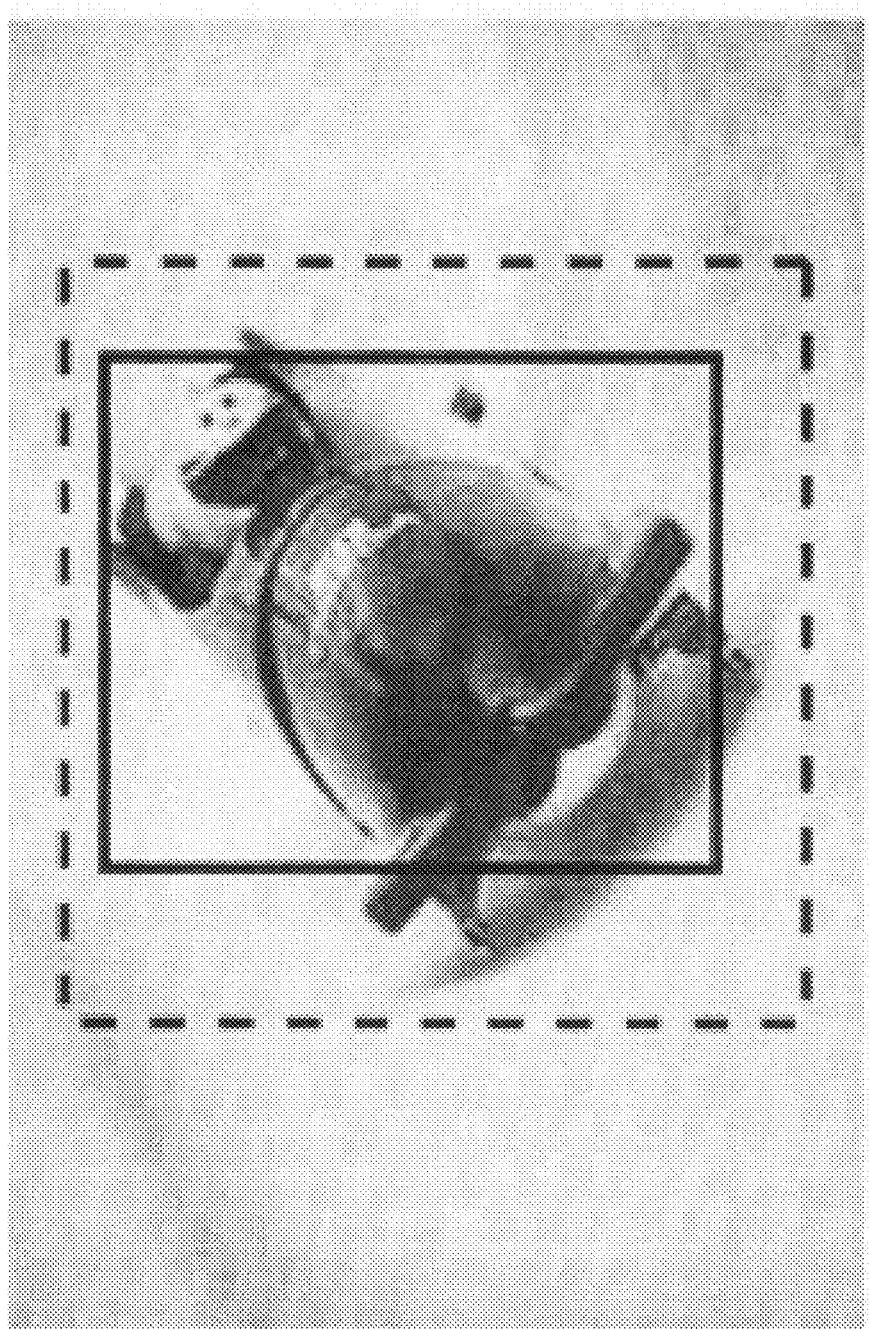
FIG. 13 illustrates one embodiment of a display showing different bounding boxes for an image.

On average, the overlap between the Peekaboom bounding boxes and the volunteer-generated ones was 0.754, with standard deviation 0.109. This means that the Peekaboom bounding boxes were very close to those generated by the volunteers. To illustrate, we show in FIG. 13 the bounding box that obtained the lowest overlap score (0.552).

Given that Peekaboom was not directly built to calculate bounding boxes, this shows the wide applicability of the data collected.

Experiment 2

Accuracy of Pings

In the second experiment, we tested whether the object pointers that are calculated from Peekaboom are indeed inside the objects. As in the previous experiment, we selected at random 50 image-label pairs from the data pool that have been successfully played on by at least two independent pairs of people. The images selected all had the word as a "noun" (as opposed to as text in the image, or an adjective, etc.; see FIG. 7). All the images chosen had the word refer to a single object in the image. For each image, Peekaboom data was used to calculate object pointers using the method explained in previous sections.

We then asked three volunteer raters to determine, for each pointer, whether it was inside the object or not. The raters were shown examples of pointers inside and outside the object and were told that "near an object" does not count as inside the object.

According to all the raters, 100% of the pointers were inside the object referred to by the word. This gives positive evidence that ping data is accurate, especially since it was calculated using such a simplistic algorithm.

The present invention has many applications. For example, advantages of the present invention can be generalized to many other problems in Artificial Intelligence. For example, other embodiments of the present invention include games such as Verbosity (von Ahn, L., Kedia, M. and Blum, M. Verbosity: A Game for Collecting Common-Sense Facts. To appear in *ACM Conference on Human Factors in Computing Systems* (*CHI Notes*), 2006) and Phetch (von Ahn, L., Ginosar, S., Kedia, M., Ruoran, L. and Blum, M. Improving Accessibility of the Web with a Computer Game. To appear in *ACM Conference on Human Factors in Computing Systems* (*CHI Notes*), 2006), in which players solve problems that computers cannot yet solve. Verbosity collects commonsense facts to train reasoning algorithms. For instance, for the word "milk," the game outputs facts such as "it is white," "people usually eat cereal with it," etc. Verbosity is a two-player game in which one player attempts to make the other say a target word (e.g., "milk") without using the word. They do so by saying many facts without using the word itself in their statements (e.g. "it is a white liquid."). The underlying game mechanism of Verbosity is similar in nature to that of Peekaboom.

Much like designing an algorithm to solve a problem, designing a game to harness valuable human cycles is to a large extent an "art". In other words, the problems usually require a specifically tailored game. In addition to an original idea, creating such a game also depends on a broader set of criteria including looks (the fluidity of the game graphics), ease of use (an intuitive user interface), cognitive load (the amount of user attention required to play the game), and action (the extent to which the game absorbs the user in the experience). All of these aspects are possible with the present invention and the techniques of the present invention allow for the creation of other games with a purpose. Finally, these design principles, like the scientific method, don't just provide ideas, but a way of thinking. As a result, the present invention provide a valuable vehicle to solve problems that computers cannot yet solve.

Although not required for practicing the present invention, one may wish to consider ethical issues associated with collecting information from individuals. In one embodiment of the present invention, players are informed of the game's purpose. In that embodiment, all participants play the game willingly and knowingly. Indeed, many people play because they like the fact that the game has a purpose.

Although the present invention has generally been described in terms of a game, the present invention is applicable to other methods, apparatuses, and systems. For example, the present invention is also applicable to non-game methods, apparatuses, and systems. In addition, the examples provided herein are illustrative and not limiting, and other variations and modifications of the present invention are contemplated. Those and other variations and modifications of the present invention are possible and contemplated, and it is intended that the foregoing specification and the following claims cover such modifications and variations.

The invention claimed is:

1. A computer readable memory device having computer-readable instructions recorded thereon which, when executed by a processor, causes the processor to perform a method, comprising:
   displaying, on a first I/O device, an image to a first player;
   associating, by the processor, a word with the image;
   displaying, on the first I/O device, the word to the first player;
   selecting, via the first I/O device, a portion of the image to be displayed on a second I/O device to a second player, wherein selecting the portion of the image is performed by the first player after displaying the word and the image on the first I/O device to the first player;
   displaying, on the second I/O device, the portion of the image to the second player, wherein the portion of the image displayed to the second player is less than all of the image, wherein the portion of the image displayed to the second player is less than the image displayed to the first player, and wherein the portion of the image displayed to the second player is determined by an action of the first player;
   allowing, by the processor, the second player to submit a word in response to displaying, on the second I/O device, the portion of the image to the second player, wherein the portion of the image displayed to the second player is less than the image displayed to the first player; and
   determining, by the processor, whether the word submitted by the second player is related to the image.

2. The method of claim 1, wherein determining whether the word submitted by the second player is related to the image includes determining whether the word submitted by the second player is the word associated with the image.

3. The method of claim 2, wherein associating the word with the image is selected from a group comprising associating the word with the image prior to displaying the image to the first player, allowing the first player to associate the word with the image, and associating a plurality of words with the image.

4. The method of claim 2, wherein determining whether the word submitted by the second player is the word associated with the image is selected from a group comprising determining whether the word submitted by the second player is a misspelled form of the word associated with the image, and determining whether the word submitted by the second player is a synonym for the word associated with the image.

5. The method of claim 1, further comprising:
   displaying an additional portion of the image to the second player, wherein the additional portion of the image displayed to the second player is determined by an action of the first player, and wherein the additional portion of the image is displayed to the second player if it is determined that the word submitted by the second player is not related to the image;
   allowing the second player to submit an additional word; and
   determining whether the additional word submitted by the second player is related to the image.

6. The method of claim 1, further comprising:
   identifying an image and a corresponding word submitted by the second player that were determined to be related to each other;
   identifying additional information associated with the word and image; and
   storing to a memory the word, the image, and the additional information associated with the word and the image.

7. The method of claim 6, wherein identifying additional information associated with the word and image is selected from a group comprising identifying the word with a portion of the image revealed to the second player, identifying the word with a portion of the image that was "pinged" by the first player, and identifying a hint given by the first player to the second player with the word and image.

8. The method of claim 1, wherein the action of the first player that determines the portion of the image displayed to the second player is clicking on the portion of the image with a computer pointer.

9. The method of claim 1 wherein the second player includes a plurality of second players, and wherein:
displaying a portion of the image includes displaying a portion of the image to each of the plurality of second players, wherein the portion of the image displayed to each of the plurality of second players is less than all of the image and wherein the portion of the image displayed to each of the second players is determined by an action of the first player;
allowing the second player includes allowing each of the second players to submit a word; and
determining includes determining for each of the plurality of second players whether the word submitted is related to the image.

10. The method of claim 1, wherein displaying a portion of the image to a second player includes preventing at least one predetermined portion of the image from being displayed to the second player.

11. The method of claim 1, further comprising allowing the first player to provide a hint to the second player regarding the word associated with the image.

12. The method of claim 1, further comprising allowing the first player to identify to the second player a particular part of the portion of the image displayed to the second player.

13. The method of claim 1, wherein at least one player is a computer.

14. The method of claim 1, wherein displaying a portion of the image to the second player includes a computer performing predetermined actions to display a portion of the image to the second player.

15. A system, comprising:
a network;
a first I/O device connected to the network;
a second I/O device connected to the network;
a processor and a memory connected to at least one of the network, the first I/O device, and the second I/O device, wherein the memory includes computer-readable instruction which, when executed, cause:
the processor to associate a word with an image;
the first I/O device to display the image;
the first I/O device to display the word;
the first I/O device to receive an input from a first player indicative of a portion of the image to be displayed on the second I/O device to a second player, wherein the input is received after the first I/O device displays the image and the word to the first player;
the second I/O device to display a portion of the image, wherein the portion of the image displayed on the second I/O device is less than all of the image, wherein the portion of the image displayed on the second I/O device is less than the image displayed to the first I/O device, and wherein the portion of the image displayed on the second I/O device is determined by the input received by the first I/O device;
the second I/O device to receive an input from the second player after the portion of the image is displayed on the second I/O device, wherein the portion of the image displayed on the second I/O device is less than the image displayed on the first I/O device; and
the processor to determine whether the input from the second I/O device is related to the image.

16. The system of claim 15, wherein the memory includes computer-readable instruction which, when executed, further cause:
the processor to determine whether the input from the second I/O device is the word associated with the image.

17. The system of claim 15, wherein the memory includes computer-readable instruction which, when executed, further cause:
the second I/O device to display an additional portion of the image, wherein the additional portion of the image displayed on the second I/O device is determined by the input received by the first I/O device and wherein the additional portion of the image is displayed on the second I/O device if it is determined that the input from the second I/O device is not related to the image;
the second I/O device to receive an additional input after the additional portion of the image is displayed on the second I/O device; and
the processor to determine whether the additional input from the second I/O device is related to the image.

18. The system of claim 15, further comprising a memory including computer-readable instruction which, when executed, cause:
a processor to identify an image and a corresponding input submitted at the second I/O device that were determined to be related to each other;
the processor to identify additional information associated with the input and image; and
the memory to store the input, the image, and the additional information associated with the input and the image.

19. An apparatus, comprising:
a processor;
first and second I/O devices connected to the processor;
a memory connected to the processor, wherein the memory includes computer-readable instruction which, when executed, cause:
the processor to associate a word with an image;
the first I/O device to display the word;
the first I/O device to display the image;
the first I/O device to receive an input from a first player indicative of a portion of the image to be displayed on the second I/O device to a second player, wherein the input is received after the first I/O device displays the image and the word to the first player;
the second I/O device to display a portion of the image, wherein the portion of the image displayed on the second I/O device is less than all of the image, wherein the portion of the image displayed on the second I/O device is less than the image displayed to the first I/O device, and wherein the portion of the image displayed on the second I/O device is determined by the input received by the first I/O device;
the second I/O device to receive an input from the second player after the portion of the image is displayed on the second I/O device, wherein the portion of the image displayed on the second I/O device is less than the image displayed on the first I/O device; and
the processor to determine whether the input from the second I/O device is related to the image.

20. The apparatus of claim 19, wherein the first and second I/O devices are the same device which is shared by first and second people using the apparatus.

21. The apparatus of claim 19, wherein the memory includes computer-readable instruction which, when executed, further cause:
    the processor to determine whether the input from the second I/O device is the word associated with the image.

22. The apparatus of claim 19, wherein the memory includes computer-readable instruction which, when executed, further cause:
    the second I/O device to display an additional portion of the image, wherein the additional portion of the image displayed on the second I/O device is determined by an additional input received by the first I/O device;
    the second I/O device to receive an additional input after the additional portion of the image is displayed on the second I/O device; and
    the processor to determine whether the additional input from the second I/O device is related to the image.

23. The apparatus of claim 19, further comprising a memory includes computer-readable instruction which, when executed, cause:
    a processor to identify an image and a corresponding input submitted at the second I/O device that were determined to be related to each other;
    the processor to identify additional information associated with the input and image; and
    the memory to store the input, the image, and the additional information associated with the input and the image.

\* \* \* \* \*